United States Patent [19]

Kosseim et al.

[11] 4,201,752
[45] May 6, 1980

[54] PROCESS FOR THE SELECTIVE REMOVAL OF SULFUR DIOXIDE FROM EFFLUENT GASES

[75] Inventors: Alexander J. M. Kosseim, Rye; Gilbert R. Atwood, Briarcliff Manor; Joseph E. Sokolik, Jr., Carmel, all of N.Y.

[73] Assignee: Union Carbide Corporation, New York, N.Y.

[21] Appl. No.: 16,400

[22] Filed: Mar. 1, 1979

[51] Int. Cl.² ............................................. B01D 53/34
[52] U.S. Cl. .................................... 423/235; 423/243
[58] Field of Search ............... 423/226, 228, 229, 235, 423/243

[56] References Cited

U.S. PATENT DOCUMENTS

| | | | |
|---|---|---|---|
| 3,719,742 | 3/1973 | Terrana et al. | 423/242 |
| 3,790,660 | 2/1974 | Earl et al. | 423/242 |
| 3,873,673 | 3/1975 | Teague et al. | 423/243 |
| 3,904,735 | 9/1975 | Atwood et al. | 423/243 |
| 4,071,602 | 1/1978 | Pearce | 423/243 |
| 4,113,849 | 9/1978 | Atwood | 423/574 R |
| 4,122,149 | 10/1978 | Dunnery et al. | 423/242 |

Primary Examiner—Earl C. Thomas
Attorney, Agent, or Firm—Dominic J. Terminello

[57] ABSTRACT

Method for scrubbing $SO_2$ from effluent gases using aqueous monoethanolamine and the corresponding sulfite as the solvent. The method is especially useful where the effluent gases contain an abundance of $CO_2$ relative to $SO_2$.

6 Claims, 1 Drawing Figure

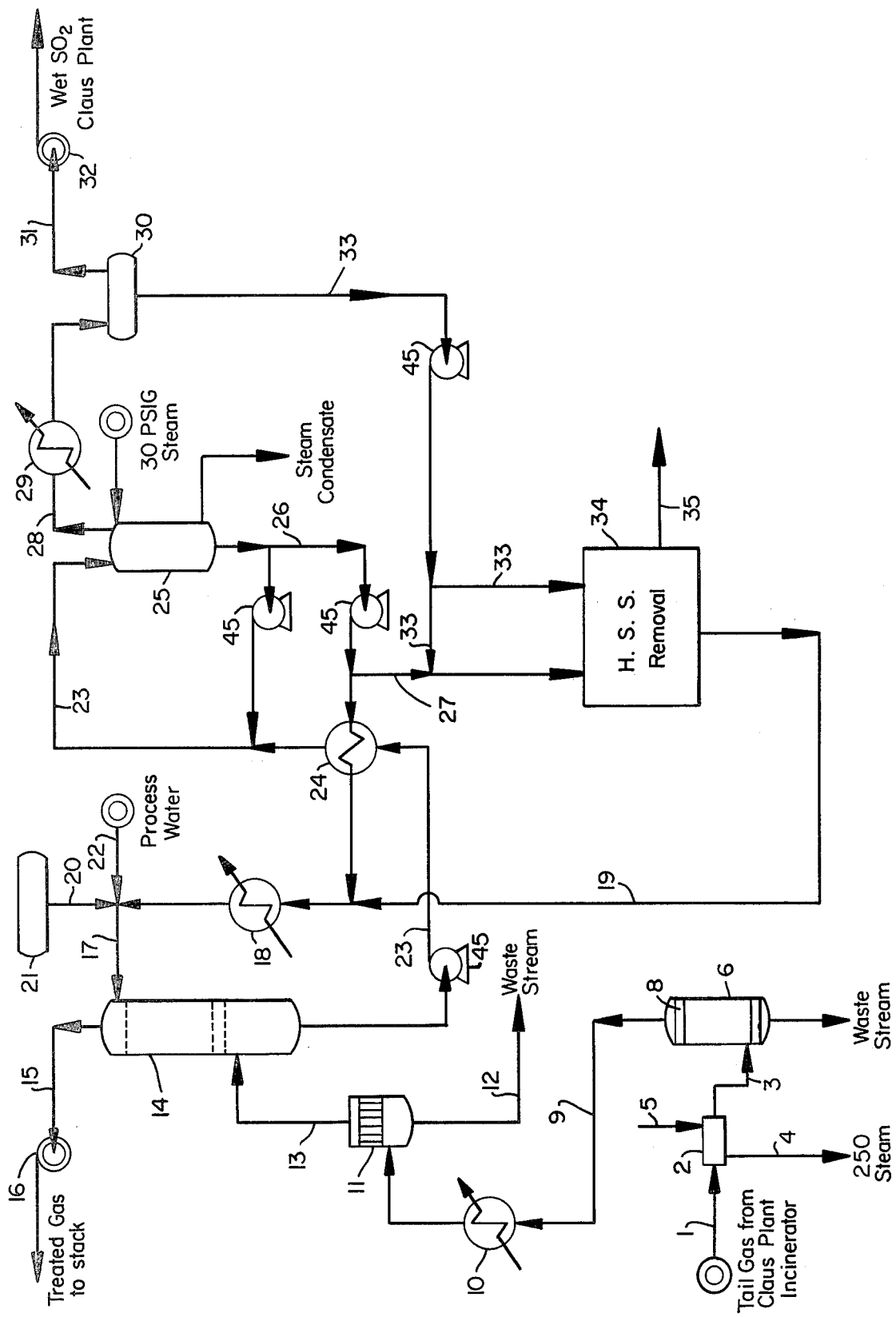

PROCESS FOR THE SELECTIVE REMOVAL OF SULFUR DIOXIDE FROM EFFLUENT GASES

BACKGROUND OF THE INVENTION

1. Field Of The Invention

This invention relates to a process for the selective removal of sulfur dioxide and mixtures of sulfur dioxide and at least one of sulfur trioxide and nitrogen oxide from effluent waste gas streams containing a preponderance of carbon dioxide and in which the absorption of carbon dioxide from these effluents is kept to a minimum. Preferably, the sulfur compounds removed from the waste gas streams are then converted to useful materials such as elemental sulfur or sulfuric acid.

2. Prior Art

The economic removal of sulfur dioxide from gaseous industrial effluents is a difficult problem which has defied satisfactory solution to the present time, but which has become a subject of intense scrutiny as concern for atmospheric pollution and ecological contamination has increased. The difficulty of economic removal has arisen essentially from the fact that the sulfur-containing gases are generally present in very low concentrations in an enormously large stream of industrial effluent gas such as from combustion waste gases, or stack gases of electric power plants, off-gases from incinerators and from other chemical and petroleum refinery plants.

A number of solutions to this problem are known to the art for the purification of gaseous streams contaminated with $SO_2$ and $SO_3$. Among the most widely used processes are those employing lime or limestone, in solution or slurry, to yield the corresponding sulfite, bisulfite and sulfate salts. Gas treating systems of this type utilize reagents in greater than stoichiometric amounts and lead to a formidable solid waste disposal problem, which is quite objectionable. Disposal of the waste product in an economic and ecologically satisfactory manner has plagued such noncyclic operations. Thus, in a scrubbing process in which lime is used and calcium salts are produced, the cost and volumetric space required in the disposal of the large amounts of waste impart a severe economic impediment to the feasibility of such nonregenerative methods of abatement.

There are significant ecological advantages to cyclic processes utilizing scrubbing solutions which can be regenerated by heating and used over again, to yield concentrated $SO_2$ for conversion to an easily disposed-of form, such as to sulfur or sulfuric acid. These cyclic operations, utilize both inorganic and organic type solvents. Among the inorganic absorbents most widely used, are aqueous solutions of ammonia, sodium hydroxide and other alkali metal hydroxides or carbonates, to yield the corresponding sulfite, bisulfite and sulfate salts. These scrubbing reagents, however, are not without their problems and disadvantages. For example, aqueous ammonia is quite volatile and its use could result in significant solvent losses to the atmosphere, as well as to air pollution problems. The use of caustic solution under certain operating conditions, as outlined in U.S. Pat. Nos. 3,719,742 and 3,790,660 to Wellman-Lord Corporation, lead to an aqueous slurry in the desorbing zone which is difficult to handle. In addition, these processes have been plagued with inefficiencies typified by a high stripping steam requirement.

These and other problems have been partly resolved by the use of high-boiling, water-soluble organic solvents. The use of alkanolamines, such as aqueous solutions of triethanolamine, has been reported as a highly efficient method for absorbing $SO_2$ from waste gases in a cycle in which the triethanolamine solvent contacts the waste gas to absorb the sulfur oxides and is thereafter stripped by heat to release the sulfur dioxide in a concentrated form. The stripped solvent is then recycled back to the absorber for further use. This type of system, using aqueous organic solvents for the selective removal of $SO_2$ is disclosed in U.S. Pat. No. 3,904,735. This reference specifically teaches that monethanolamine (MEA) is unsatisfactory for the following three factors:

(a) MEA solvent, due to its high basicity, does not selectively absorb $SO_2$ readily, without absorbing appreciable quantities of $CO_2$;

(b) High evaporative losses of the solvent due to its high volatility;

(c) A high rate of oxidation of $SO_2$ to $SO_3$ takes place in MEA solvent system, because of the oxygen present in the flue gases. The $SO_3$ is not normally strippable from the solvent and results in loss of MEA absorbent capacity as it accumulates.

SUMMARY OF THE INVENTION

Contrary to the above, and quite unexpectedly, it now has been found that an aqueous solution of MEA and its sulfite salt is not only a useful solvent for the selective removal of $SO_2$, but that it offers many advantages over the tertiary alkanolamine solvents mentioned in U.S. Pat. No. 3,904,735, which heretofore were thought by the prior art to be unobtainable with MEA.

The art of absorbing acid gases, e.g., carbon dioxide ($CO_2$) from natural and process gas streams with MEA is well known. However, this art and the solvent used are not entirely applicable to $SO_2$ scrubbing, as $CO_2$ removal differs from $SO_2$ scrubbing in the following particulars:

(1) In the $SO_2$ process, the component to be removed is already at low concentration in the feed gas, while in the $CO_2$ process it is a bulk constituent ($\sim 15\%$) which is to be removed. Consequently, there is relatively little mass transfer involved in the $SO_2$ process and the gas passes through the absorber at constant volume.

(2) The heat effect of absorbing the $SO_2$ is small relative to the heat capacity of the incoming gas stream. Whereas, in the $CO_2$ process the temperature from stage to stage is determined by the highly exothermic reaction of $CO_2$ and MEA, in the $SO_2$ process the stage to stage temperature gradients are mainly determined by small changes in water content of the liquid and gas streams.

(3) $SO_2$ is much more acidic than $CO_2$ (first ionization constants $1.7 \times 10^{-2}$ vs $4.3 \times 10^{-7}$). The practical consequence of this is that in the $SO_2$ case absorption in a basic solution is easy and stripping is difficult, in the $CO_2$ case the reverse is true.

(4) In the $CO_2$ process the feed gas is at moderately high pressure ($\sim 400$ psi.) and the pressure reduction required for stripping is obtained by flashing to atmospheric pressure; in the $SO_2$ process the feed is at one atm. and pressure reduction requires vacuum.

(5) While $CO_2$ and its ions are the stable form of carbon in aqueous solution, $SO_2$ and its ions are thermodynamically unstable at all pH's. It spontaneously decomposes in solution to yield various sulfur oxy-anions such as sulfate, thiosulfate and thionates hereinafter referred to as heat stable salts (HSS).

Furthermore, common gas treating solvents such as MEA or other alkanolamines in aqueous solution are not themselves good solvents for the selective absorption of $SO_2$. Whereas, they will indeed absorb $SO_2$, they will also absorb $CO_2$. Furnace exhaust gases, for example, contain about 100 times as much $CO_2$ as $SO_2$; obviously, if one were to absorb the $CO_2$ as well, the process would have to be 100 times as large. These facts were well recognized by G. R. Atwood et al. (U.S. Pat. No. 3,904,735) who proposed a process based upon trialkanolamines or tetraalkanolamines—the most selective for $SO_2$ of organic base type solvents, while clearly eliminating MEA as a possible solvent.

DESCRIPTION OF EXPERIMENTS AND BASIS OF THE INVENTION

The prior art teaches several valid reasons for preferring tri- or tetrahydroxy functionality over MEA. Such compounds are higher boiling, e.g., less volatile than other alkanolamines and less likely to be lost by evaporation into the stack gas. This is shown by the boiling temperature and vapor pressure data for the most common ethanolamines, which are tabulated below and indicate that MEA loss would be approximately 100-fold that of triethanolamine (TEA).

|  | MEA | TEA |
|---|---|---|
| Boiling temperature (°C.) at 10mm Hg | 71 | 205 |
| Vapor pressure (mm Hg) at 50° C. | 2–3 | 0.01 |

Since solvent losses in the absorber effluent could lead to considerable economic penalty, an experiment was run to evaluate MEA losses under typical absorber conditions. Nitrogen and $SO_2$ were blended by rotameters such that the combined gas stream had an $SO_2$ concentration of 100 ppm at a total gas flow rate of 5 liters per minute. Four 500 ml gas washing bottles with coarse fritted sparge tubes were assembled in series. The first was filled with $H_2O$ to saturate the gas prior to its contacting the lean MEA solution and dehydrating the solution. The second washing bottle contained an aqueous solution of MEA sulfite of known weight and having the following composition: 31.84 wt.% $H_2O$, 41.71 wt.% MEA, 23.66 wt.% $SO_2$ and the balance (2.79 wt.%) being other sulfur oxy compounds. The solvent was maintained at 50° C. to simulate absorber conditions. The third washing bottle contained a 10% $H_2SO_4$ solution to scrub out any amine that might be vaporized from the preceding bottle. The fourth vessel was a caustic trap to scrub out the $SO_2$ before venting. The solvent was sparged for a period of 96 hours, after which the solution was weighed and analyzed. No loss of MEA was detected.

This startling and unexpected result does not agree with the vapor pressure data for pure MEA. It was then realized that by using as a solvent the sulfite salt of MEA rather than the base itself, solvent losses through the absorber vent could be almost eliminated.

In addition to the high selectivity and low volatility of triethanolamine, the inventors of U.S. Pat. No. 3,904,735 recognized that the gas streams to be treated would contain oxygen and that the oxidation of $SO_2$ (or sulfite) to $SO_3$ (or sulfate) under the mildly oxidizing conditions prevailing in the absorber was a real possibility. G. R. Atwood et al. discovered that higher hydroxyl functionality acts to inhibit the oxidation of $SO_2$ to $SO_3$ in the absorber. It was largely on the basis of this data that TEA was chosen as the preferred solvent.

Whereas, TEA would be an excellent solvent in a situation in which $SO_2$ oxidation to sulfate is the major source of HSS, in many circumstances this is not the case. It was subsequently discovered in the course of operation of an integrated bench-scale unit for $SO_2$ removal, that sulfate was but one of the HSS formed in the process and that other species were produced under stripping (nonoxidizing) conditions. These species, the products of $SO_2$ disproportionation and other side reactions, have been found to make up the bulk of the HSS anions and these include, in addition to sulfate, thiosulfate, dithionate, trithionate and other species. All of these are more acidic than $SO_2$ and form salts with any base which are not strippable by thermal means. Their buildup in the solvent reduces its capacity for $SO_2$ and thus requires greater solvent circulation rates and a large purge stream must be taken for discard or chemical reclaiming. They also reduce the vapor pressure of $SO_2$ in the solvent (the vapor pressure lowering effect of an inert diluent) and thus necessitate greater stripping effort. Reducing the rate of heat stable salts formation by selecting the appropriate solvent and operating parameters are keys to the economic success of the process.

In order to determine the relative amount of HSS produced in the absorber and stripper, solutions of TEA sulfite/bisulfite were tested for heat stable salt formation in static sparging experiments under conditions of temperature and pressure appropriate to either the absorber or stripper of an $SO_2$ removal process. In these tests a portion of solution preloaded to a given $SO_2$ mol loading (mols $SO_2$/mole base) was charged to a flask and maintained at a constant temperature while being stirred and sparged with a mixture of nitrogen, $SO_2$ and oxygen (absorber conditions) or nitrogen and $SO_2$ (stripper conditions). The $SO_2$ is included in the sparging mixture in order to maintain solvent loading. Periodically, samples of the liquid were withdrawn and analyzed for heat stable salts. The experimental conditions and results are reported in Table I. The portion called "other HSS" refers primarily to di- and trithionates which could not be analyzed individually. The rate of HSS formation is presented as the ratio of the amount of base present as HSS to the total amount of solvent base. This hourly rate of change could be represented by a single value because the above expression was found to be an approximate linear function of the time of exposure.

Referring to Table I, we notice that at 40° C. the rate of oxidation increases with increasing oxygen content of the contacted gas (Run No. A vs. B). To simulate stripper conditions, three temperatures were tested—80°, 90° and 100° C. The rate of HSS buildup was found to increase with increasing temperature, from an average of 0.39% per hour at 80° C. (Runs C and D) to 4.3% per hour at 100° C. (Run F). These tests with aqueous TEA solution as solvent indicate that under typical absorber conditions of 40° C. and 5% oxygen (Run A) and at a stripper temperature of 90° C. (Run E), the rate of HSS formation under stripping conditions is approximately 89 times that in the absorber (0.89% vs. 0.01% per hour, respectively). Evaluation of the entire $SO_2$ removal process thus indicates that approximately 98% of the HSS formed in the system is a result of disproportionation in the stripper, while oxidation in the absorber accounts for only 2% of the HSS.

These findings led to an intensive search for means of controlling the rate of conversion of $SO_2$ to HSS in the stripper and also for means of economically removing them. During studies on alternate solvent reclaiming techniques, it was discovered, contrary to expectations, that under stripper conditions MEA solvent results in a significantly lower HSS buildup rate than the other solvents investigated. The data for MEA solvent systems are shown in Table II for 80°, 90° and 100° C. test temperature.

A comparison of the average rate of HSS formation (in % per hour) in MEA and TEA solvent systems under typical operating conditions is shown below:

|  | MEA | TEA |
|---|---|---|
| Absorber conditions at 40° C. and 5% $O_2$ | 0.03 | 0.01 |
| Stripping conditions at 90° C. | 0.11 | 0.89 |
| TOTAL | 0.14 | 0.90 |

Thus, at the above process parameters, the total HSS buildup with MEA and TEA is estimated at 0.14 and 0.90 percent per hour, respectively. These findings are quite surprising and indicate that the use of MEA instead of TEA would result in an overall reduction in HSS formation of approximately 84%, and show the superiority of MEA over tertiary alkanolamines. These results are quite surprising and no rationale for these phenomena has yet been found.

TABLE I
RATE OF HSS FORMATION WITH TEA SOLUTIONS IN BENCH-SCALE SPARGING AT 40°, 80°, 90° and 100° C.

| Absorber/Stripper Conditions | Absorber | | Stripper | | | |
|---|---|---|---|---|---|---|
| Run No. | A | B | C | D | E | F |
| Temperature (°C.) | 40 | 40 | 80 | 80 | 90 | 100 |
| Sparging Gas Composition (Balance $N_2$) | | | | | | |
| Oxygen (vol. %) | 5 | 20 | 0 | 0 | 0 | 0 |
| $SO_2$ (vol. %) | 0.02 | 0.02 | 0.15 | 1.8 | 1.8 | 31.0 |
| Initial Solvent Composition | | | | | | |
| TEA, wt % | 64.1 | | 65.9 | 70.0 | 69.5 | 58.3 |
| $SO_2$, wt % | 22.0 | | 14.2 | 18.9 | 17.2 | 23.8 |
| $H_2O$, wt % | 13.9 | | 19.9 | 11.1 | 13.3 | 17.9 |
| Average Composition of HSS | | | | | | |
| Sulfate, mole % | 100 | 100 | 38 | 37 | 32 | 36 |
| Thiosulfate, mole % | 0 | 0 | 45 | 41 | 40 | 40 |
| Other HSS, mole % | 0 | 0 | 17 | 22 | 28 | 24 |
| $SO_2$/TEA, mole loading | .79–.82 | .79–.85 | .52–.55 | .88–.95 | .58–1.0 | .95–.99 |
| Solution pH range | 6.5 | 6.3–6.9 | 7.3–7.6 | 5.8–6.5 | 5.1–7.5 | 4.9–5.0 |
| Rate of HSS formation, % per hour, TEA as HSS/total TEA | 0.01 | 0.06 | 0.22 | 0.56 | 0.89 | 4.3 |

TABLE II
RATE OF HSS FORMATION WITH MEA SOLUTIONS IN BENCH-SCALE SPARGING EXPERIMENTS AT 80°, 90° and 100° C. STRIPPING ONLY

| Temperature (°C.) | 80 | 90 | 100 |
|---|---|---|---|
| Initial Solvent Composition | | | |
| $H_2O$, wt % | 27.2 | | |
| $SO_2$, wt % | 29.8 | | |
| Amine, wt % | 43.0 | | |
| $SO_2$/Amine, mole loading | 0.65–0.71 | 0.65–0.82 | 0.65–0.87 |
| Rate of HSS formation, % per hour, Amine as HSS/total amine | 0.083 | 0.11 | 0.39 |

DEFINITION OF THE INVENTION

The invention is based on the use of an aqueous solution of MEA sulfite as the absorption solution to selectively remove $SO_2$ from process gas streams. The absorption solution consists essentially of the following:

(a) From about 20% of about 60% by weight of monoethanolamine;

(b) From about 10% to about 40% by weight of sulfur dioxide such that the molar ratio of sulfur dioxide to available monoethanolamine is always greater than or equal to 0.5/1. This is necessary to maintain the monoethanolamine as monoethanolamine sulfite. The available monoethanolamine is defined as the amount of the total monoethanolamine that is not complexed with heat stable salt (HSS) anions;

(c) At least about 4% by weight of water, at a solvent composition flow to gas flow ratio such that the molar concentration of sulfur oxides to be absorbed therein does not exceed the molar concentration of water present.

The invention, therefore can be defined in a general way by the process of selectively removing $SO_2$ from gas mixtures which consists essentially of the following steps:

(1) passing the gas mixture at a temperature below 80° C. and preferably at about 30° to 50° C. (to obtain good mass transfer) through an absorber in contact with the above-defined solvent composition;

(2) absorbing sulfur dioxide in said solvent;

(3) passing the absorbent solvent composition containing absorbed sulfur dioxide at a maximum temperature of about 120° C. (to prevent solvent decomposition) to at least one stripping tower and stripping absorbed sulfur dioxide while maintaining the temperature in the stripper such that the stripping temperature does not exceed about 120° C. and is preferably about 80°–100° C. (to minimize sulfur dioxide disproportionation reactions and heat stable salt formation);

(4) removing from the stripper a stripped lean solvent bottoms composition containing a maximum of about 40 percent by weight of sulfur oxides (to insure adequate absorbing capacity) and at least about 1 mole of water for each mole of sulfur dioxide remaining in said lean solvent;

(5) recycling the stripped lean solvent bottoms from step (4) to the absorber together with sufficient water to provide a solvent absorbent composition having the same composition as that defined above; and (6) removing from the stripper a vapor consisting essentially of sulfur dioxide and water.

When the effluent gas stream to be treated by the process of this invention also contains sulfur trioxide or if sulfur trioxide and other sulfur oxy anions are produced by oxidation and disproportionation of sulfur dioxide, these species must be removed from the absorbent solvent. This can be accomplished by any number of methods known in the art, such as by chemically treating a portion of the solvent by ion exchange technique as disclosed in U.S. Pat. No. 4,122,149.

BRIEF DESCRIPTION OF DRAWING

The sole FIGURE in the drawing is a flow diagram illustrating a preferred mode of practicing the invention.

DESCRIPTION OF A SPECIFIC EMBODIMENT

The drawing illustrates a unit and process for treating the tail gas effluent from a typical three-stage Claus plant. The conditions of the feed gas before incineration are given in Table III. This feed gas is incinerated to convert all sulfur compounds to sulfur dioxide and all hydrocarbons to carbon dioxide. The incinerated gas has a $SO_2$ content of about 10,000 ppmv. The gas, after treatment by this invention, sent to the atmosphere, has $SO_2$ and $SO_3$ concentrations less than 200 and 15 ppmv, respectively.

TABLE III

| Feed Specifications | Claus Tail Effluent |
|---|---|
| Pressure, psia | 17.7 |
| Temperature, °C. | 137° |
| Density, lbs/cu. ft. | 0.0558 |
| Molecular Weight | 25.05 |

Referring now to the drawing, a stream 1 of tail gas from the Claus plant incinerator enters a waste heat boiler 2 at 500°–1000° C. and exits through stream 3 at 235°–325° C. producing 250 psi steam in line 4 from water entering the boiler 2 through line 5. The exit temperature of stream 3 is well above the dew point of $H_2SO_4$ thus avoiding acid condensation which would create a difficult corrosion problem. The gas is the quenched in quench tower 6 to remove $SO_3$. The liquid and gas are separated in an $SO_3$ knock-out pad 8 at then top of the quench tower 6.

The quenched gas stream 9 is cooled to about 40° C. in the feed cooler 10 using cooling tower water. Condensation is removed in a high-efficiency demister 11 and is disposed of through waste stream 12. This step is necessary to minimize the carry-over of sulfuric acid mist to the absorber.

The cool gas stream 13 enters the base of a ten-tray absorber 14 where it countercurrently contacts the absorbent, MEA sulfite, which consists of about 47 wt.% MEA; about 21 wt.% $H_2O$; and 32 wt.% $SO_2$ and other sulfur oxides. The $SO_2$ content of the gas is reduced from about 10,000 to <200 ppmv (more or less depending on pollution regulations). The treated gas stream 15 leaving the top of the absorber has about a 40° C. dew point. It is sent to an induced draft blower 16 and then to the stack. The treated gas can be reheated with the incinerator tail gas stream 1 in a regenerative heat exchanger if required to control pluming and ensure buoyancy.

Lean absorbent stream 17, which has been cooled to about 40° C. by cooler 18 and to which regenerated absorbent stream 19 and make-up absorbent stream 20 from make-up reservoir 21 and water stream 22 have been added, is fed into the top of the absorber 14. It passes downward, countercurrent to the gas stream, absorbing $SO_2$. The rich absorbent stream 23 exits the bottom of the absorber 14 and is heated to about 70° C. in heat exchanger 24 by the lean absorbent stream 26 which is cooled to about 65° C. The rich absorbent stream 23 then enters the absorbent stripper 25 where water and $SO_2$ are evaporated at low pressure (100 mm Hg) and moderate temperature (90° C.). Stripper 25 is a falling-film type evaporator with indirect steam heating. The lean absorbent stream 26 is sent back to the absorber 14 via exchanger 24 and cooler 18, while a purge stream 27 is sent to regeneration for HSS removal in unit 34, as described, for example, in U.S. Pat. No. 4,122,149. Circulating pumps 45 are provided at appropriate locations to ensure adequate circulation. The stripper overhead stream 28 which is laden with water, is condensed in condenser 29 and separated in separator 30. The wet $SO_2$ vapor stream 31 from the separator 30 is pumped by vacuum compressor 32 to the Claus plant. The condensed water stream 33 is recycled back to the process through the HSS removal unit 34 and/or to the purge stream 27.

The purge stream 27 of the circulating absorbent is treated in unit 34 to remove sulfate and any HSS buildup in the system. The regenerated absorbent stream 19 from HSS removal unit 34 is returned to the absorber 14. The removed HSS are disposed of through waste stream 35.

While the invention has been described with reference to a best mode of operation, it is understood that such description is by way of illustration to one skilled in the art in order for him to practice the invention. However, it is obvious that changes in apparatus and manner of carrying out certain steps will occur to a person skilled in the art without departing from the spirit and scope of the invention. For example, while the solvent is primarily MEA sulfite, it is obvious that some unreacted MEA could be present in the system.

What is claimed is:

1. The process for the selective removal of sulfur oxides from gas mixtures containing at least such sulfur oxides and carbon dioxide which comprises:
    (a) passing the gas mixture at a temperature below 80° C. through an absorber in countercurrent contact with an absorbent solvent composition consisting essentially of
        (1) from about 20 to about 60% by weight of monoethanolamine;
        (2) from about 10 to about 40% by weight of sulfur dioxide such that the molar ratio of sulfur dioxide to available monoethanolamine is always greater than or equal to 0.5/1; and
        (3) at least about 4% by weight water at a solvent composition flow to gas flow ratio such that the molar concentration of sulfur oxides to be absorbed therein does not exceed the molar concentration of water present;
    (b) absorbing said sulfur oxides in said solvent composition;
    (c) passing the aborbent solvent composition containing absorbed sulfur oxides at a maximum temperature of about 120° C., to at least one stripper tower and stripping the absorber sulfur dioxide from the absorbent solvent composition while maintaining the temperature in the stripper below 120° C.;

(d) removing from the stripper a stripped lean solvent bottom composition containing a maximum of about 40% by weight of sulfur dioxide and at least about one mole of water for each mole of sulfur oxides remaining in said lead solvent;

(e) recycling the stripped lean solvent bottoms from step (d) to the absorber together with sufficient water to provide a solvent absorbent composition having the same composition as defined in step (a); and (f) removing from the stripper a vapor consisting essentially of sulfur dioxide and water.

2. A process according to claim 1 wherein the sulfur oxide is sulfur dioxide.

3. A process according to claim 1 for removal of sulfur oxides and nitrogen oxides from gas mixtures containing at least sulfur oxides, nitrogen oxides and carbon dioxide.

4. A process according to claim 1 wherein the gas mixture is passed through an absorber at a temperature in the range of 30° to 50° C.

5. A process according to claim 1 wherein the temperature of the stripper is in the range of 80° to 100° C.

6. A process according to claim 1 wherein the gas mixture contains an abundance of carbon dioxide relative to sulfur oxides.

* * * * *